United States Patent
Takamoto et al.

(10) Patent No.: US 7,640,367 B2
(45) Date of Patent: Dec. 29, 2009

(54) METHOD FOR EXECUTING A SOFTWARE UPDATING PROCESS AND COMPUTER FOR IMPLEMENTING THE METHOD

(75) Inventors: Akio Takamoto, Matsumoto (JP); Takeshi Yamada, Matsumoto (JP)

(73) Assignee: Seiko Epson Corporation (JP)

( * ) Notice: Subject to any disclaimer, the term of this patent is extended or adjusted under 35 U.S.C. 154(b) by 148 days.

(21) Appl. No.: 11/899,586

(22) Filed: Sep. 6, 2007

(65) Prior Publication Data
US 2008/0071942 A1   Mar. 20, 2008

(30) Foreign Application Priority Data
Sep. 6, 2006   (JP)   ............... 2006-241114
Sep. 6, 2006   (JP)   ............... 2006-241115

(51) Int. Cl.
G06F 3/00      (2006.01)
G06F 9/44      (2006.01)
G06F 9/445     (2006.01)

(52) U.S. Cl. ............... 710/6; 710/8; 710/10; 710/15; 710/18; 710/20; 710/21; 710/30; 710/58; 710/104; 717/168; 717/169; 717/170; 717/171; 717/172; 717/173; 717/174; 717/175; 717/176; 717/177; 717/178

(58) Field of Classification Search ............... None
See application file for complete search history.

(56) References Cited

U.S. PATENT DOCUMENTS 6,754,178 B1   6/2004   Sasaki
2004/0031029 A1 *   2/2004   Lee et al. ............... 717/171
2004/0148379 A1   7/2004   Ogura
2006/0030325 A1 *   2/2006   Okita et al. ............... 455/439
2006/0130046 A1 *   6/2006   O'Neill ............... 717/168
2006/0239195 A1 *   10/2006   Camins et al. ............... 370/235

FOREIGN PATENT DOCUMENTS

JP   9-214804   8/1997
JP   2004-139572   5/2004

* cited by examiner

Primary Examiner—Tanh Q Nguyen
(74) Attorney, Agent, or Firm—Baker Hostetler, LLP

(57) ABSTRACT

A method to update firmware in a plurality of peripheral devices and a computer using the method to reduce data transmission collisions and to reduce the time required to complete the update process. The process involves sending firmware update data from a computer that is connected to a communication network to printers or other peripheral devices that are also connected to the communication network. The computer 11 groups a plurality of peripheral devices (such as printers 13a1) connected to the communication network into separate transmission unit groups each containing up to a maximum number of peripheral devices with the maximum number determined by measuring the transmission speed of the network and thereafter deriving the maximum number by experimentation at the measured transmission speed. The update data for updating the firmware is transmitted to the peripheral devices of any one transmission unit group. Thereafter update data is sequentially transmitted to the peripheral devices in another transmission unit group but not until the completion of transmitting the update data to all of the peripheral devices in the first transmission unit group is confirmed.

7 Claims, 5 Drawing Sheets

PRIOR ART

METHOD FOR EXECUTING A SOFTWARE UPDATING PROCESS AND COMPUTER FOR IMPLEMENTING THE METHOD

BACKGROUND OF THE INVENTION

1. Field of Invention

The present invention relates to a method for executing a software updating process and to a computer for implementing the method. More particularly, the invention relates to a method and computer for updating the firmware of a printer or other peripheral device connected to a communication network.

2. Description of Related Art

In order to update the firmware in a printer or other peripheral device connected to a communication network to provide a new version or correct problems in the existing firmware, a computer that is connected to the same communication network sends the firmware update data to the printer or other peripheral device, which receives the update data and executes an update process.

Furthermore, in order to keep the manufacturing cost of certain devices such as printers, for example, low the printers are manufactured with standardized firmware circuit boards and the standardized firmware is overwritten with custom firmware or fonts for other languages as may be required prior to shipping. This is typically done by connecting multiple (ranging from several ten to several hundred) printers with the standardized firmware to a common communication network and simultaneously transmitting the firmware update data from the host computer to the printers to update the firmware.

More specifically, the printer or other peripheral device has a storage means such as flash ROM that stores the firmware. The host computer sends an updated version of an image file of the firmware that is stored in the flash ROM device in the Motorola (R) S3 format, for example, over the communication network to the printer or other peripheral device.

The Motorola (R) S3 format can be converted to a binary data record. More specifically, as shown in FIG. 6, the firmware update data is segmented into object data blocks each being a maximum of 250 bytes long. A 7-byte header including a 2-byte type field, a 1-byte data length field, and a 4-byte address field, and a 1-byte checksum are then added to each object data block to output a binary data unit train.

As demand for improved printer functionality has grown, printer firmware has also grown more complex and the size of the firmware update data has therefore also grown. The number of data units transmitted to update the firmware once has therefore also increased.

This increase in the size of the update data to be transmitted has become a problem in terms of the transmission time when sending the update data to a large number of printers or other peripheral devices connected to the communication network. More specifically, if the printers or other peripheral devices are connected by Ethernet™ and update data of a large size is simultaneously sent to the printers or other peripheral devices, the network load increases dramatically, packet collisions occur on the network, and data is lost.

When a collision in data transmission occurs in TCP (transmission control protocol) communications, transmission is automatically retried so that the packets are resent. As the number of retries increases, the update data transmission time also increases by the time required for the retries.

UDP (User Datagram Protocol) communication affords higher communication efficiency than TCP communication because packet collisions do not automatically activate this retry process. On the other hand, packet collisions require manually executing the retry process, thus increasing the workload and transmission time.

Addressing this problem, Japanese Unexamined Patent Appl. Pub. JP-A-H09-214804 teaches a method of reducing data transmission collisions on the network when sending and receiving video between multiple nodes connected to the network by having each node assert a next video transmission request after detecting that transmission of a particular video unit has finished, and cycling through the nodes asserting the video transmission requests in a prescribed order.

However, applying the method taught in Japanese Unexamined Patent Appl. Pub. JP-A-H09-214804 is not necessarily effective when sending firmware update data from a computer connected to the communication network to the printers or other peripheral devices connected to the same communication network. The method taught in Japanese Unexamined Patent Appl. Pub. JP-A-H09-214804 effectively reduces collisions when sending video bidirectionally between multiple nodes, but is not effective when sending a large number of packets in one direction from a computer to multiple peripheral devices.

A method of reducing collisions between data transmission and reducing the time required to complete the update process when sending firmware update data from a computer that is connected to a communication network to printers or other peripheral devices that are also connected to the communication network is therefore needed.

SUMMARY OF THE INVENTION

The present invention is directed to a method and to a computer for implementing the method which will reduce collisions of data transmission and reduce the time required to complete the update process when sending firmware update data from a computer to a plurality of peripheral devices that are connected to the communication network in common.

The method of suppressing collisions and reducing the firmware update process execution time in accordance with the present invention involves an arrangement for adjusting the update data transmission schedule as further described below.

A first aspect of the invention is an update processing method whereby a computer connected to a communication network executes a process to update firmware in a plurality of peripheral devices that are connected to the communication network, the method having steps of: grouping the plurality of peripheral devices into transmission unit groups each containing up to a prescribed maximum number of peripheral devices; transmitting update data for the firmware to the peripheral devices in one transmission unit group; and sequentially transmitting the update data to the peripheral devices in one other transmission unit group after confirming the completion of transmitting the update data to all of the peripheral devices in the one transmission unit group to which the update data was transmitted.

This aspect of the invention enables the computer to group the plurality of peripheral devices into transmission unit groups each containing up to a prescribed maximum number of peripheral devices; transmit update data for the firmware to the peripheral devices in one transmission unit group; and sequentially transmit the update data to the peripheral devices in one other transmission unit group after confirming the completion of transmitting the update data to all of the peripheral devices in the one transmission unit group to which the update data was transmitted.

When sending the update data to a plurality of peripheral devices, this arrangement enables the computer to send the update data to transmission unit groups containing a prescribed maximum number of peripheral devices. As a result, when the update process is applied to a number of peripheral devices exceeding this prescribed maximum number, the computer can suppress the packet collisions that can occur when simultaneously transmitting a large number of packets to multiple devices, and can therefore reduce the update process execution time.

This prescribed maximum number can be set appropriately according to the communication environment, such as according to the transmission speed of the communication network. More specifically, if the network is a 100 Mbps Ethernet™ network, the prescribed maximum number is set to eight, for example.

Further preferably, the method of the invention also has a step of measuring the transmission speed of the communication network, and the prescribed maximum number is determined according to the measured transmission speed.

This aspect of the invention enables the computer to measure the transmission speed of the communication network, group the plurality of peripheral devices into transmission unit groups each containing up to a prescribed maximum number of peripheral devices where this maximum number is determined according to the measured transmission speed; transmit update data for the firmware to the peripheral devices in one transmission unit group; and sequentially transmit the update data to the peripheral devices in one other transmission unit group after confirming the completion of transmitting the update data to all of the peripheral devices in the one transmission unit group to which the update data was transmitted.

When sending the update data to a plurality of peripheral devices, this arrangement enables the computer to send to each transmission unit group containing a maximum number of peripheral devices where this maximum number is determined according to the measured transmission speed of the communication network. As a result, when the update process is applied to a number of peripheral devices exceeding this maximum number of devices that is determined according to the measured transmission speed of the communication network, the computer can suppress the packet collisions that can occur when simultaneously transmitting a large number of packets to multiple devices, and can therefore reduce the update process execution time.

This maximum number can be set appropriately according to the measured transmission speed of the communication network. More specifically, if the effective transmission speed of the network is 70 Mbps, the maximum number is preferably set to eight, for example, which is based upon experimentation.

Further preferably, the method of the invention also has a preprocessing step in which the computer gets information identifying the update data to be transmitted from all of the peripheral devices in the one transmission unit group before transmitting the update data to the peripheral devices in the one transmission unit group.

This aspect of the invention enables the computer to get information identifying the update data to be transmitted from all of the peripheral devices in the one transmission unit group before transmitting the update data to the peripheral devices in the one transmission unit group.

This arrangement enables the computer to identify the update data to be sent to each of the peripheral devices, suppress collisions resulting from getting this information, and therefore reduce the update process execution time by getting model name information or firmware version information, for example, from all of the peripheral devices in the one transmission unit group before transmitting the update data to the peripheral devices in one transmission unit group. As a result, even if one transmission unit group contains peripheral devices requiring transmission of different update data, the computer can identify the update data to be sent to each peripheral device, suppress collisions resulting from transmitting this information, and therefore reduce the update process execution time.

Further preferably, the method of the invention also has a post-processing step in which the computer executes a post-processing operation to get information confirming completion of the update process from all peripheral devices in the one transmission unit group after confirming the completion of transmitting the update data to all of the peripheral devices in the one other transmission unit group after completing writing the update data to all of the peripheral devices in the one transmission unit group.

This aspect of the invention enables the computer to get information confirming completion of the update process from all peripheral devices in the one transmission unit group after confirming the completion of transmitting the update data to all of the peripheral devices in the one other transmission unit group after completing writing the update data to all of the peripheral devices in the one transmission unit group.

By confirming completion of the update process in all peripheral devices in the one transmission unit group after finishing writing the update data to all of the peripheral devices in the one transmission unit group by getting firmware version information or reset confirmation information, for example, from the peripheral devices, and avoiding executing the post-processing operation step while sending the update data to the peripheral devices in one other transmission unit group, this arrangement enables the computer to suppress collisions and thereby reduce the update process execution time. As a result, the computer can suppress collisions and therefore reduce the update process execution time while also reliably verifying completion of the update process by executing the post-processing step.

Further preferably, the method of the invention also has a step of the computer executing the preprocessing operation step and the post-processing operation step by UDP communication, and retrying a prescribed number of times if the preprocessing operation step or the post-processing operation step does not terminate normally.

This aspect of the invention enables the computer to execute the preprocessing operation step and the post-processing operation step by UDP communication, and retry a prescribed number of times if the preprocessing operation step or the post-processing operation step does not terminate normally.

By using UDP communication for the preprocessing step and the post-processing step, this arrangement enables the computer to execute these steps more efficiently compared with using TCP communication. Furthermore, by retrying these steps a prescribed number of times (such as three, for example) if they do not finish normally, the update process execution time can be reduced.

Further preferably, the method of the invention also has a step of the computer reassigning a peripheral device that reported an error to a different transmission unit group so that the number of peripheral devices does not exceed the prescribed maximum number if in the post-processing step the computer finds a peripheral device that reports an error in the update process.

If in the post-processing step the computer finds a peripheral device that reports an error in the update process, this arrangement enables the computer to reassign the peripheral device that reported an error to a different transmission unit group so that the number of peripheral devices does not exceed the prescribed maximum number.

This aspect of the invention thus enables the computer to reassign a peripheral device that reported an error to a different transmission unit group while keeping the number of peripheral devices in each group less than or equal to the allowed maximum number so that the update process will be repeated for the peripheral device that reported the error. As a result, if an error occurs in a peripheral device during the update process, the computer can automatically reapply the update process to that peripheral device while continuing to suppress collisions, and can therefore also reduce the update process execution time.

Another aspect of the invention is a computer that executes a process to update firmware in a plurality of peripheral devices connected to a communication network, the computer having a means of grouping the plurality of peripheral devices into transmission unit groups each containing up to a prescribed maximum number of peripheral devices; a means of transmitting update data for the firmware to the peripheral devices in one transmission unit group; and a means of sequentially transmitting the update data to the peripheral devices in one other transmission unit group after confirming the completion of transmitting the update data to all of the peripheral devices in the one transmission unit group.

This aspect of the invention enables the computer to group the plurality of peripheral devices into transmission unit groups each containing up to a prescribed maximum number of peripheral devices; transmit update data for the firmware to the peripheral devices in one transmission unit group; and sequentially transmit the update data to the peripheral devices in one other transmission unit group after confirming the completion of transmitting the update data to all of the peripheral devices in the one transmission unit group.

Further preferably, the computer also has a means of measuring the transmission speed of the communication network, and the prescribed maximum number is determined according to the measured transmission speed.

This aspect of the invention enables the computer to measure the transmission speed of the communication network, group the plurality of peripheral devices into transmission unit groups each containing up to a prescribed maximum number of peripheral devices where this maximum number is determined according to the measured transmission speed; transmit update data for the firmware to the peripheral devices in one transmission unit group; and sequentially transmit the update data to the peripheral devices in one other transmission unit group after confirming the completion of transmitting the update data to all of the peripheral devices in the one transmission unit group.

Other objects and attainments of the present invention will become apparent and appreciated together with a fuller understanding of the invention by referring to the following description and claims when read in conjunction with the accompanying drawings:

DESCRIPTION OF THE PREFERRED EMBODIMENTS

A preferred embodiment of the present invention is described below with reference to the accompanying figures.

Figure 1:
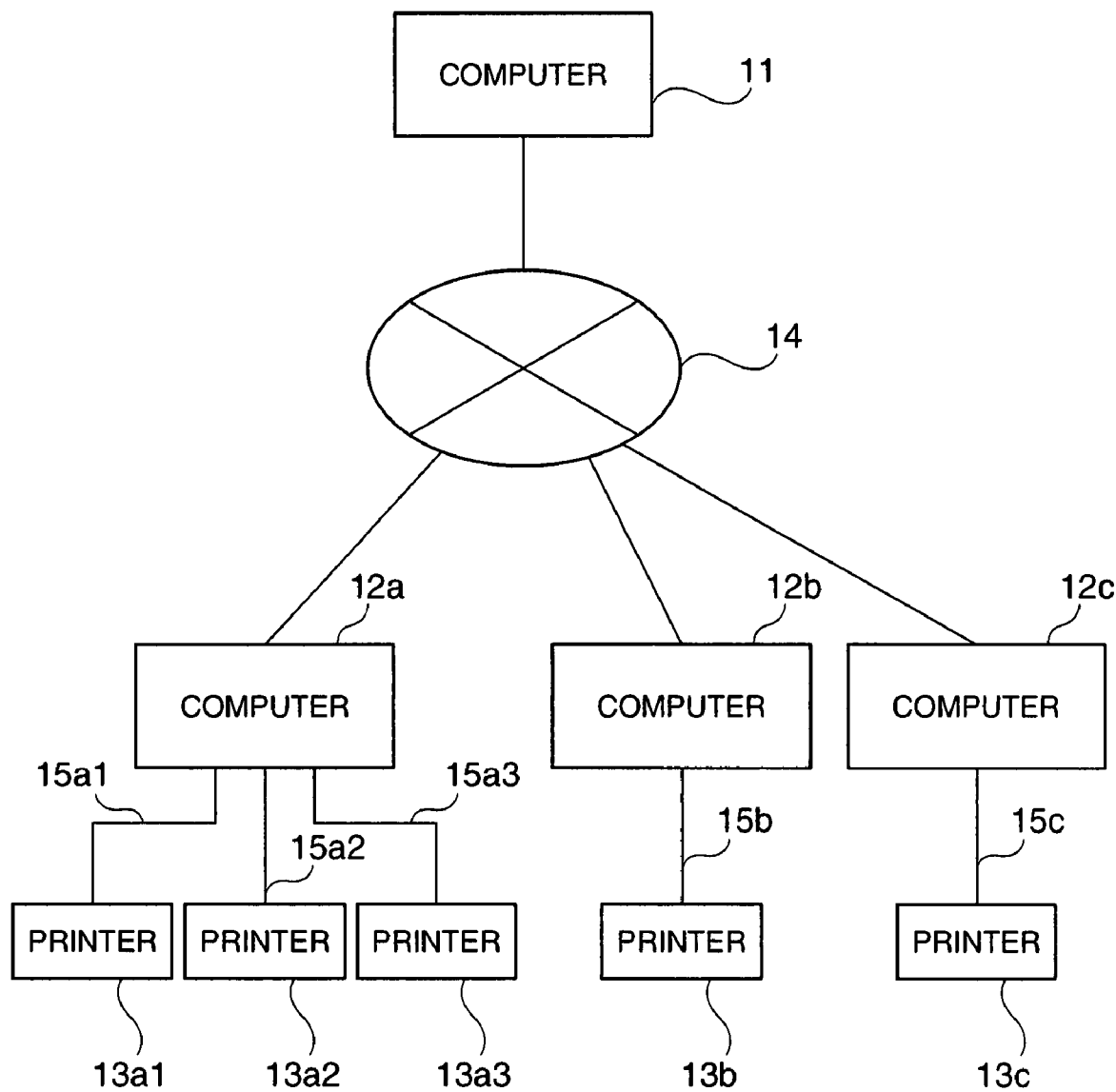
FIG. 1 is a schematic block diagram showing the overall arrangement of a computer system including a communication network having a plurality of peripheral devices connected in common with the firmware in each of the devices adapted to be updated according to a preferred embodiment of the invention.

FIG. 1 is a schematic block diagram showing the overall arrangement of a computer system including a communication network having a plurality of peripheral devices connected in common with the firmware in each of the devices adapted to be updated according to a preferred embodiment of the invention.

It should be noted that the invention is not limited to the number of computers 11, 12a, 12b, 12c and printers 13a1, 13a2, 13a3, 13b, 13c shown in the figures and that any number of peripheral devices may be used in the invention.

General System Arrangement

As shown in FIG. 1 the system 1 according to a preferred embodiment of the invention includes a plurality of computers 11, 12a, 12b, 12c and a plurality of printers 13a1, 13a2, 13a3, 13b, 13c used by way of example to illustrate a peripheral device.

The computers 11, 12a, 12b, 12c are connected over a communication network 14. The printers 13a1, 13a2, 13a3 are connected to one computer 12a over communication networks 15a1, 15a2, 15a3. Printer 13b is connected to computer 12b over a communication network 15b, and printer 13c is connected to computer 12c over a communication network 15c.

In the embodiment shown in FIG. 1 the computers 12a, 12b, 12c can be common personal computers or specialized information processing devices such as electronic cash registers.

The communication network 14 could be an Ethernet™ local area network (LAN) or a wide-area network (WAN) that uses dedicated lines, the Internet, or a VPN, for example. The benefits of the invention are even greater when the communication network 14 is a WAN and computer 11 is located remotely from the computers 12a, 12b, 12c.

The communication networks 15a1, 15a2, 15a3, 15b, and 15c can use an RS-232C, USB, or other serial interface, or a SCSI or other parallel interface.

The computers 12a, 12b, 12c can also be connected to the computer 11 at different transmission speeds over the communication network 14.

The printers 13a1, 13a2, and 13a3 can likewise be connected at different transmission speeds to the communication networks 15a1, 15a2, 15a3.

Computer Arrangement

Figure 2:
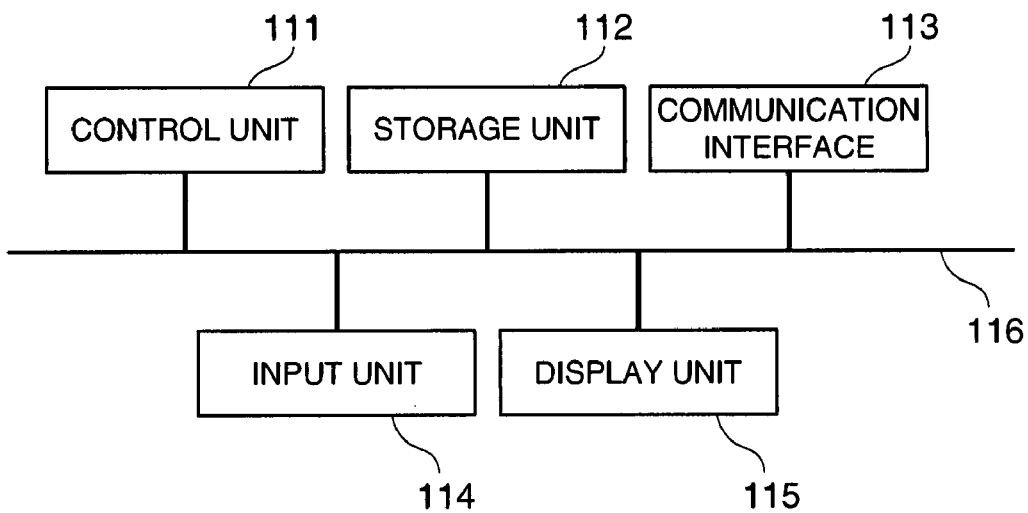
FIG. 2 is a block diagram showing the arrangement of a preferred embodiment of a computer for practicing the method of the invention to update the firmware of the devices shown in FIG. 1.

As shown in FIG. 2 the computers 11, 12a, 12b, 12c each have a control unit 111, a storage unit 112, a communication interface 113, an input unit 114, and a display unit 115 connected to a common bus 116.

The control unit 111 is an information processing device that calculates information and runs processes, and is typically a CPU (central processing unit). The control unit 111 controls the overall operation of the computer 11, 12a, 12b, 12c, and appropriately reads and executes programs stored in the storage unit 112 to cause the hardware components to work together and achieve the functions of the present invention.

The display unit 115 displays screens for getting data input from the user and displaying the results of operations performed by the computers 11, 12a, 12b, 12c, and can be any type of display device including CRT and liquid crystal display (LCD) monitors.

The input unit 114 is used for getting user input, and may include a keyboard and pointing device. The input unit 114 can be connected directly or through an intervening I/O controller to the computer 11, 12a, 12b, 12c.

The communication interface 113 is a network adapter for connecting the computers 11, 12a, 12b, 12c to a terminal over a dedicated network or a public network. The communication interface 113 includes modems, cable modems, and Ethernet™ adapters.

The storage unit 112 includes local memory and large capacity bulk memory used for executing programs in conjunction with the control unit 111, and cache memory used for efficiently searching the bulk memory. Computer-readable media that can be used to render the storage unit 112 include electrical, magnetic, optical, and electromagnetic media. More specifically, the storage unit 112 can be rendered using a semiconductor storage device, magnetic tape, floppy disks, random access memory (RAM) devices, read-only memory (ROM) devices, and optical disc media including CD-ROM, CD-RW, and DVD media, for example.

Printer Arrangement

Figure 3:
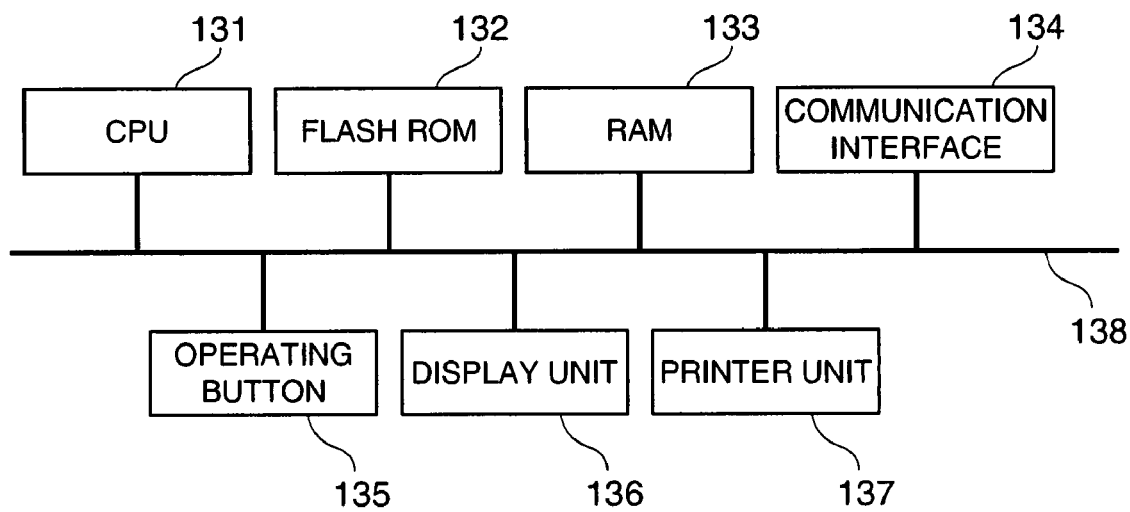
FIG. 3 is a block diagram showing the arrangement of a printer according to the present invention.

As shown in FIG. 3 the printers 13a1, 13a2, 13a3, 13b, 13c include a CPU 131, flash ROM 132, RAM 133, a communication interface 134, an operating button 135, a display unit 136, and a printer unit 137 connected to a common bus 138.

The CPU 131 is an information processing device that calculates information and runs processes, controls the overall operation of the printer 13a1, 13a2, 13a3, 13b, 13c, and appropriately reads and executes the firmware and other programs stored in the flash ROM 132 to cause the hardware components to work together and achieve the functions of the present invention.

The display unit 136 displays screens for getting data input from the user and displaying the results of operations performed by the printers 13a1, 13a2, 13a3, 13b, 13c, and can be a liquid crystal display (LCD) unit.

The operating button 135 is used for getting user input, and may be any of various types of buttons and input devices. The operating button 135 can be connected directly or through an intervening I/O controller to the printer 13a1, 13a2, 13a3, 13b, 13c.

The flash ROM 132 device stores the firmware that is updated using the update data of the present invention, and in this embodiment of the invention can be batch written and erased in block units of a specific size such as 64 KB.

The RAM 133 device includes local memory and large capacity bulk memory used for executing programs in conjunction with the CPU 131, and cache memory used for efficiently searching the bulk memory.

The printer unit 137 is not described in detail herein, but includes the print head and paper feeding unit for actually printing as controlled by the CPU 131.

Update Process

Figure 4:
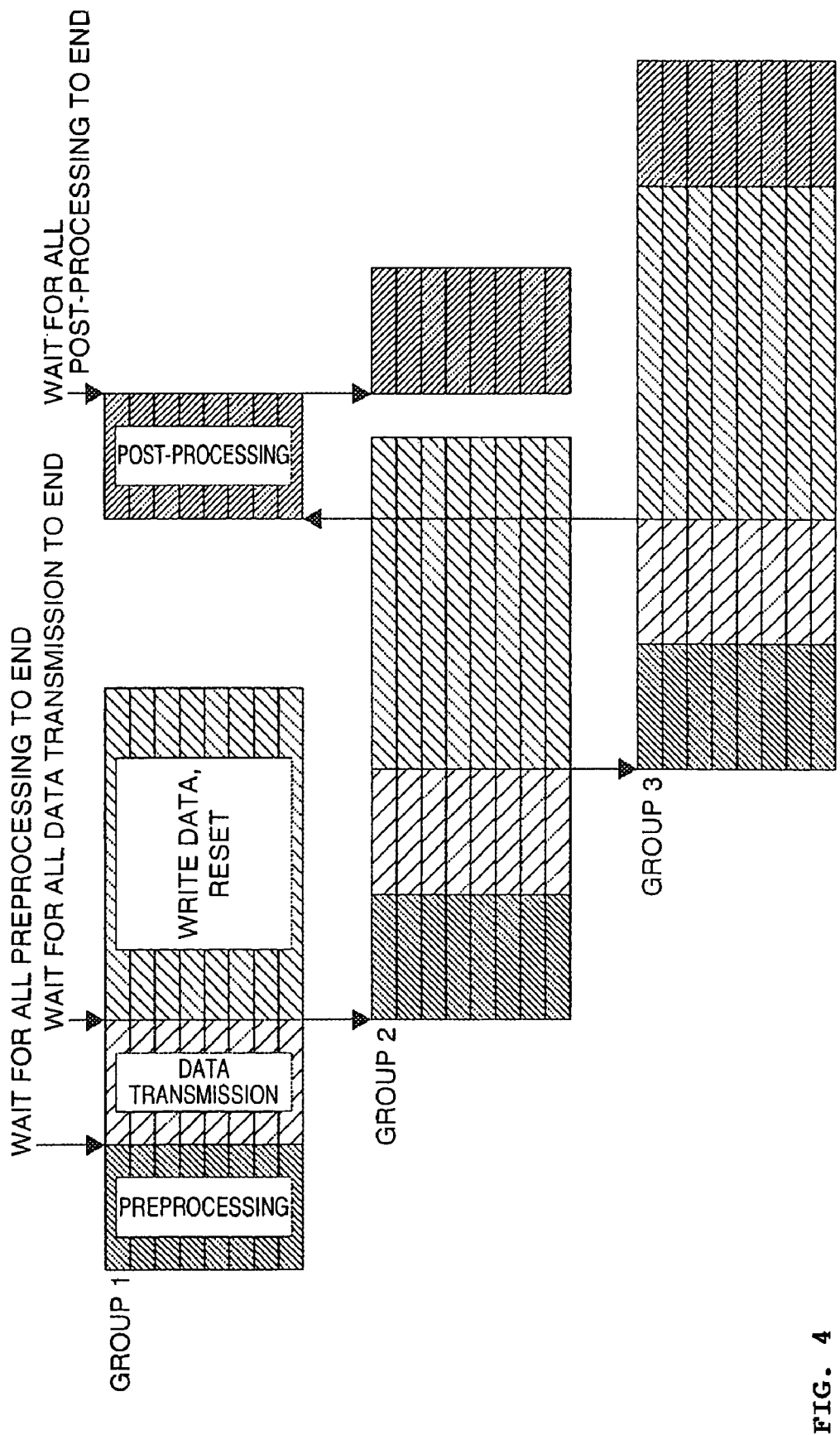
FIG. 4 describes the updating process according to a preferred embodiment of the invention.

As shown in FIG. 4, the computer system 1 according to this embodiment of the invention executes a process for updating the firmware stored in the flash ROM 132 of each of the printers 13a1, 13a2, 13a3, 13b, 13c.

The control unit 111 of the computer 11 divides the printers 13a1, 13a2, 13a3, 13b, 13c into transmission unit groups having up to a predetermined maximum number of printers.

More specifically, if the communication network 14 is a 100 Mbps Ethernet™ network, the control unit 111 divides the printers 13a1, 13a2, 13a3, 13b, 13c into transmission unit groups each having up to a maximum of eight printers as shown in FIG. 4.

The control unit 111 then executes a preprocessing operation for sending the firmware update data to the printers (the printers in the transmission unit group identified as Group 1 in the example shown in FIG. 4) constituting one of the transmission unit groups.

More specifically, the control unit 111 identifies the update data to be sent to each of the printers by getting the firmware version information and model name information for the printers in the transmission unit group labeled Group 1.

The control unit 111 can execute this preprocessing operation by UDP communication. By using UDP communication to communicate data that fits into a single packet, such as a command and its response, overhead is less and the processing time is shorter than when using TCP communication, which must open a session and perform post-processing.

The control unit 111 then sends the update data for the firmware identified in the preprocessing operation to each of the printers in Group 1 (in the "data transfer" process shown in FIG. 4).

The control unit 111 does not transmit the update data until preprocessing has ended for all of the printers in Group 1. This avoids packet collisions and the loss of preprocessing packets or update data packets, and thus enables efficiently transmitting the update data to the printers in Group 1.

In addition, the control unit 111 does not start the preprocessing operation for sending the update data to the printers in any of the other transmission unit groups (Group 2 or Group 3 in the example in FIG. 4) until transmitting the update data to all of the printers in Group 1 is finished. This limits the number of printers that the computer 11 communicates with at any time to the maximum number of printers in one transmission unit group, thereby suppresses packet collisions, and therefore reduces the update process execution time.

Furthermore, after finishing writing the update data to all of the printers in Group 1, the control unit 111 waits to execute the post-processing operation for the printers in Group 1 until after transmitting the update data to all of the printers in the other transmission unit groups (Group 2 and Group 3 in the example in FIG. 4) has finished.

More specifically, the control unit 111 confirms that the update process to the transmission unit group 1 is finished by getting the firmware version information and reset confirmation information from all of the printers in the transmission unit group identified as Group 1.

The control unit 111 can execute the post-processing operation using UDP communication. This limits the number of printers that the computer 11 communicates with at any time to the maximum number of printers in one transmission unit group, thereby suppresses packet collisions, and therefore reduces the update process execution time.

If in the post-processing operation the control unit 111 discovers a printer in which an error occurred in the update process for some reason, including the firmware version number does not match the updated version number or the printer could not reset after writing the update data, the control unit 111 allocates the printer for which an error occurred to another transmission unit group while keeping the number of printers in the group within the maximum number of printers so that the update process repeats for that printer.

In the example shown in FIG. 4, if the control unit 111 discovers a printer in Group 3, for example, in which the update process caused an error, the control unit 111 reassigns that printer to a transmission unit group other than Group 1 to Group 3 for which the update process has not started and the number of printers in the group is less than the maximum of, for example, 8. If such a transmission unit group does not exist, a new transmission unit group is created.

As a result, if an error occurs in the update process, the control unit 111 automatically reapplies the update process to the printer where the error was found while still limiting the number of printers that the computer 11 communicates with at one time to the maximum number of printers in each transmission unit group, and thereby suppresses collisions.

Figure 5:
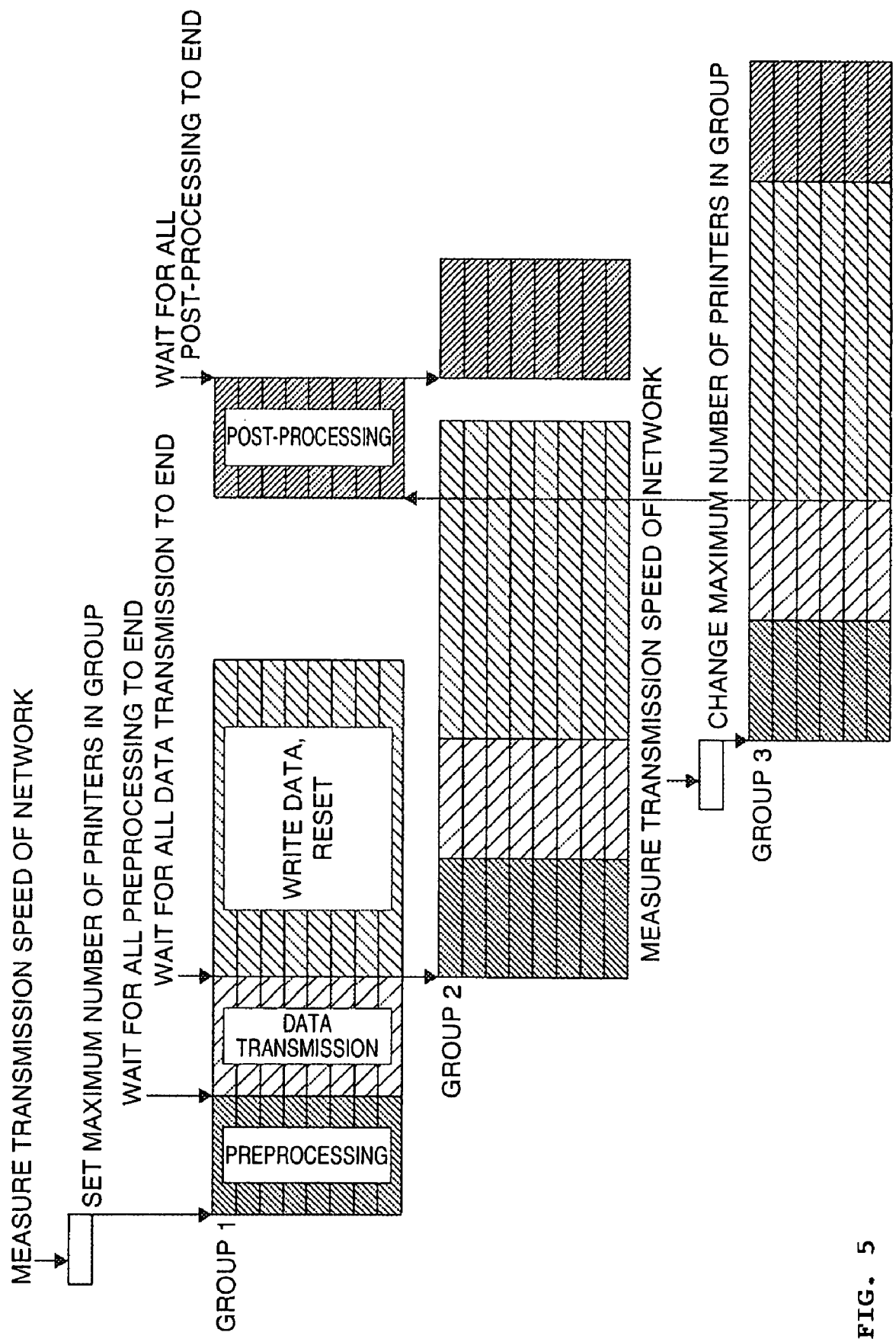
FIG. 5 describes the updating process according to another embodiment of the invention.
Figure 6:
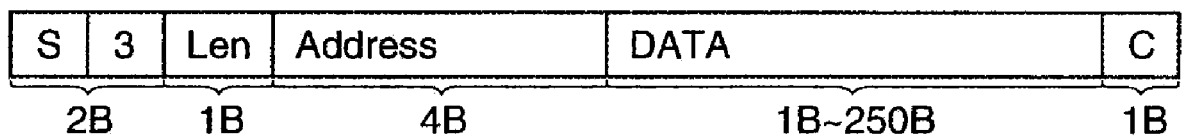
FIG. 6 describes the structure of the update data according to the present invention.

The system 1 according to another preferred embodiment of the invention executes a process for updating the firmware stored in the flash ROM 132 in the printers 13a1, 13a2, 13a3, 13b, 13c as shown in FIG. 5.

In this process the control unit 111 of the computer 11 first measures the transmission speed of the communication network 14.

More specifically, the computer 11 sends benchmark data of a prescribed file size to the printers 13a1, 13a2, 13a3, 13b, 13c and measures the time until the receiving side finishes receiving the benchmark data to determine the transmission speed with each of the printers.

The control unit 111 then of the computer 11 then divides the printers 13a1, 13a2, 13a3, 13b, 13c into transmission unit groups having up to a maximum number of printers determined according the measured transmission speed.

More specifically, if the measured transmission speed is 70 Mbps, for example, the printers 13a1, 13a2, 13a3, 13b, 13c are divided into transmission unit groups containing a maximum of eight printers as shown in FIG. 5. The maximum number of printers can be pre-assigned based upon experimentation for a given maximum transmission speed or can be set according to the measured transmission speed in correlation to the given maximum transmission speed so that the firmware update data can be simultaneously sent to as many printers as possible while continuing to suppress collisions.

The control unit 111 is not limited to measuring the transmission speed only at the beginning of the update process. More specifically, the control unit 111 can also measure the transmission speed of the communication network 14 again during the update process and change the maximum number of printers in each transmission unit group according to this result when the measured speed is slower than the given maximum transmission speed.

More specifically, in the example shown in FIG. 5 the control unit 111 measures the transmission speed again before applying the update process to the printers in Group 3, and can change the maximum number of printers if the measured transmission speed is slower than the previously measured speed. (The maximum is changed from the eight shown in the example in FIG. 4 to six printers.) If in the post-processing operation the control unit 111 discovers a printer in which an error occurred in the update process for some reason, including the firmware version number does not match the updated version number or the printer could not reset after writing the update data, the control unit 111 allocates the printer for which an error occurred to another transmission unit group while keeping the number of printers in the group within the maximum number of printers so that the update process repeats for that printer.

The invention is described above using a printer as an example of a peripheral device, but the scope of the invention is not so limited. More particularly, the invention can also be used to update the firmware in other types of peripheral devices including video cards and storage drives. The invention can also be used for a host computer to update the software in a client terminal.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An update processing method using a computer to update firmware in a plurality of peripheral devices connected in common to a communication network, the method comprising steps of:

measuring the transmission speed of the communication network;

grouping said plurality of peripheral devices into separate transmission unit groups each containing up to a prescribed maximum number of peripheral devices with the maximum number derived from experimentation at the measured transmission speed;

transmitting update data for the firmware to the peripheral devices in one transmission unit group; and consecutively transmitting the update data to the peripheral devices in each of the other transmission unit groups in sequence upon receiving confirmation of the completion of transmitting the update data to all of the peripheral devices in a preceding transmission unit group to which the update data was transmitted.

2. The method described in claim 1, further comprising a step of:

using the computer to execute a preprocessing operation to get information identifying the update data to be transmitted from all of the peripheral devices in said one transmission unit group before transmitting the update data to the peripheral devices in another transmission unit group.

3. The method described in claim 2, further comprising a step of:

using the computer to execute a post-processing operation to get information confirming completion of the update process from all peripheral devices in the one transmission unit group.

4. The method described in claim 3, further comprising a step of:

using the computer to execute the preprocessing operation step and the post-processing operation step by User Datagram Protocol (UDP) communication, and retrying a prescribed number of times if the preprocessing operation step or the post-processing operation step does not terminate normally.

5. The method described in claim 3, further comprising a step of:

using the computer to reassign a peripheral device that has reported an error in the update process during the post-processing operation step to a subsequent transmission unit group, the number of peripheral devices in the subsequent transmission unit group not exceeding the prescribed maximum number when the reassigned peripheral device is included in the subsequent transmission unit group.

6. The method described in claim 1, wherein the step of measuring the transmission speed of the communication network comprises sending test benchmark data of a given size to the peripheral devices in any one transmission unit group and measuring the time it takes the peripheral devices to finish receiving said test benchmark data.

7. A computer for executing a process to update the firmware in a plurality of peripheral devices connected to a common communication network, comprising:

means for measuring the transmission speed of the communication network;

means for grouping the plurality of peripheral devices into transmission unit groups each containing up to a prescribed maximum number of peripheral devices with the maximum number derived from experimentation at the measured transmission speed;

means for transmitting update data for the firmware to the peripheral devices in one transmission unit group; and means for consecutively transmitting the update data to the peripheral devices in each of the other transmission unit groups in sequence upon receiving confirmation of the completion of transmitting the update data to all of the peripheral devices in a preceding transmission unit group to which the update data was transmitted.

* * * * *